March 31, 1959 W. ROBISON ET AL 2,880,285
ELECTRIC SWITCHES
Filed Sept. 22, 1955 7 Sheets-Sheet 3

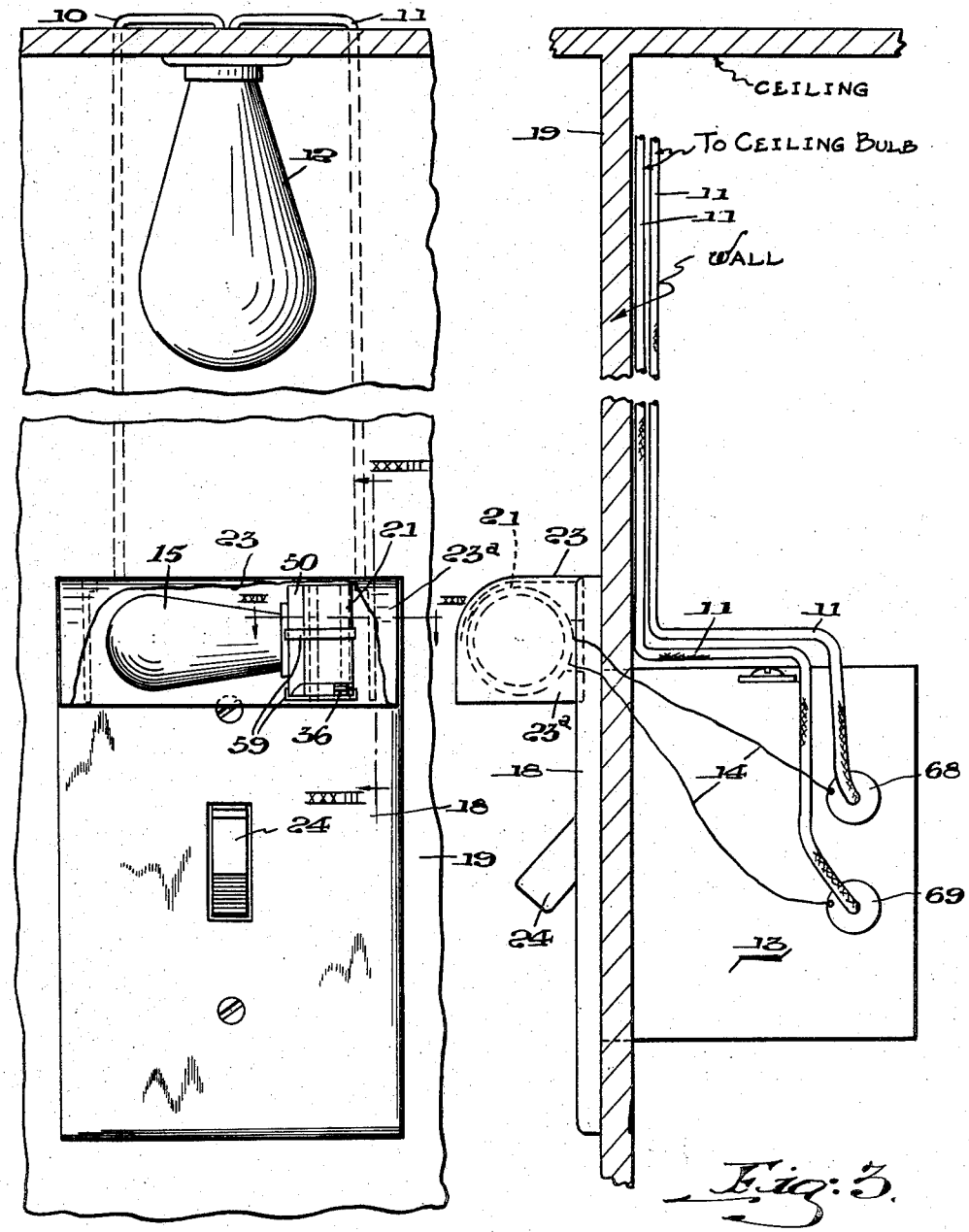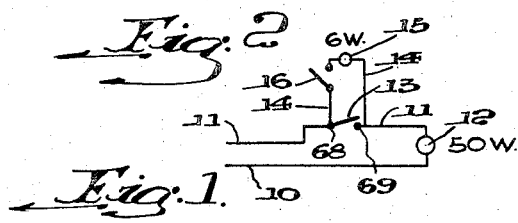

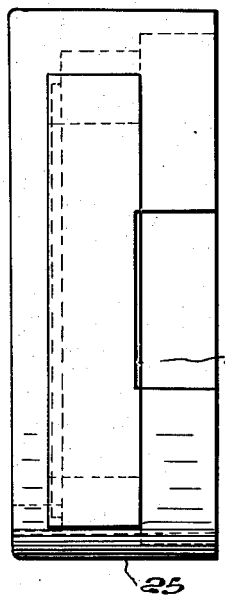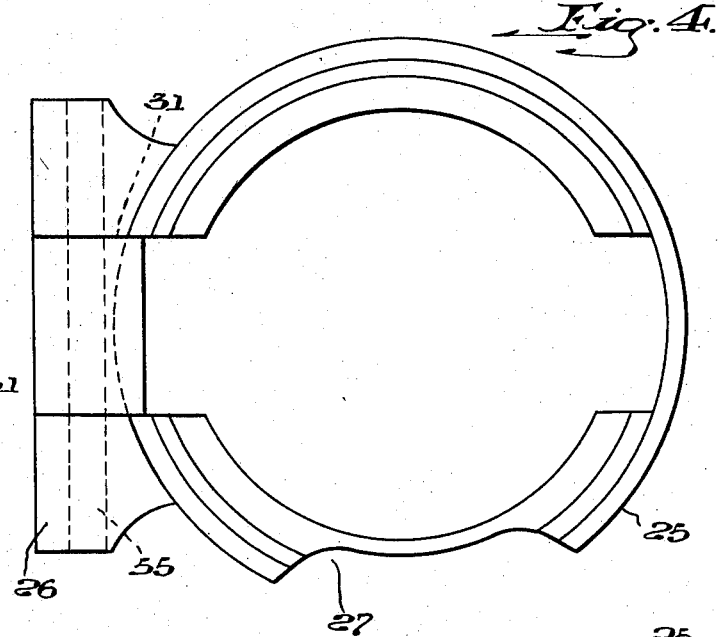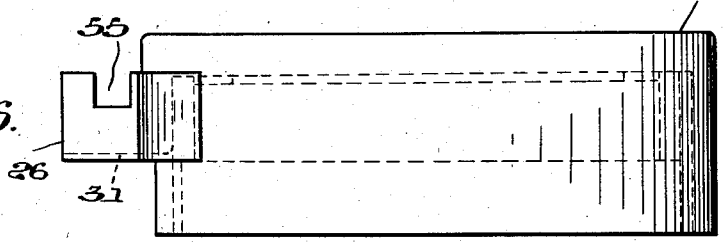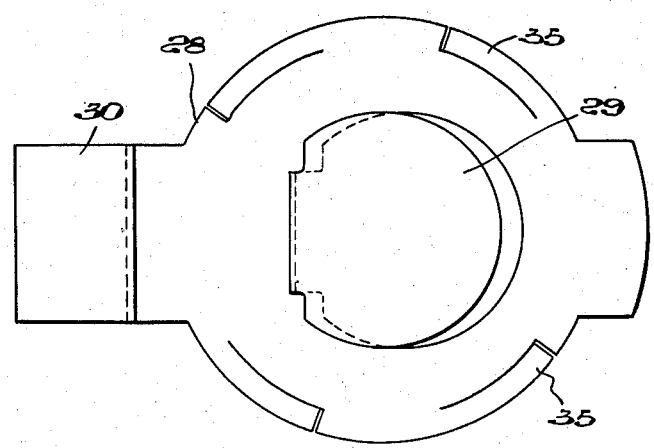

INVENTORS.
WILBUR ROBISON, &
WILLIAM ROBISON.
BY Archworth Martin
their ATTORNEY.

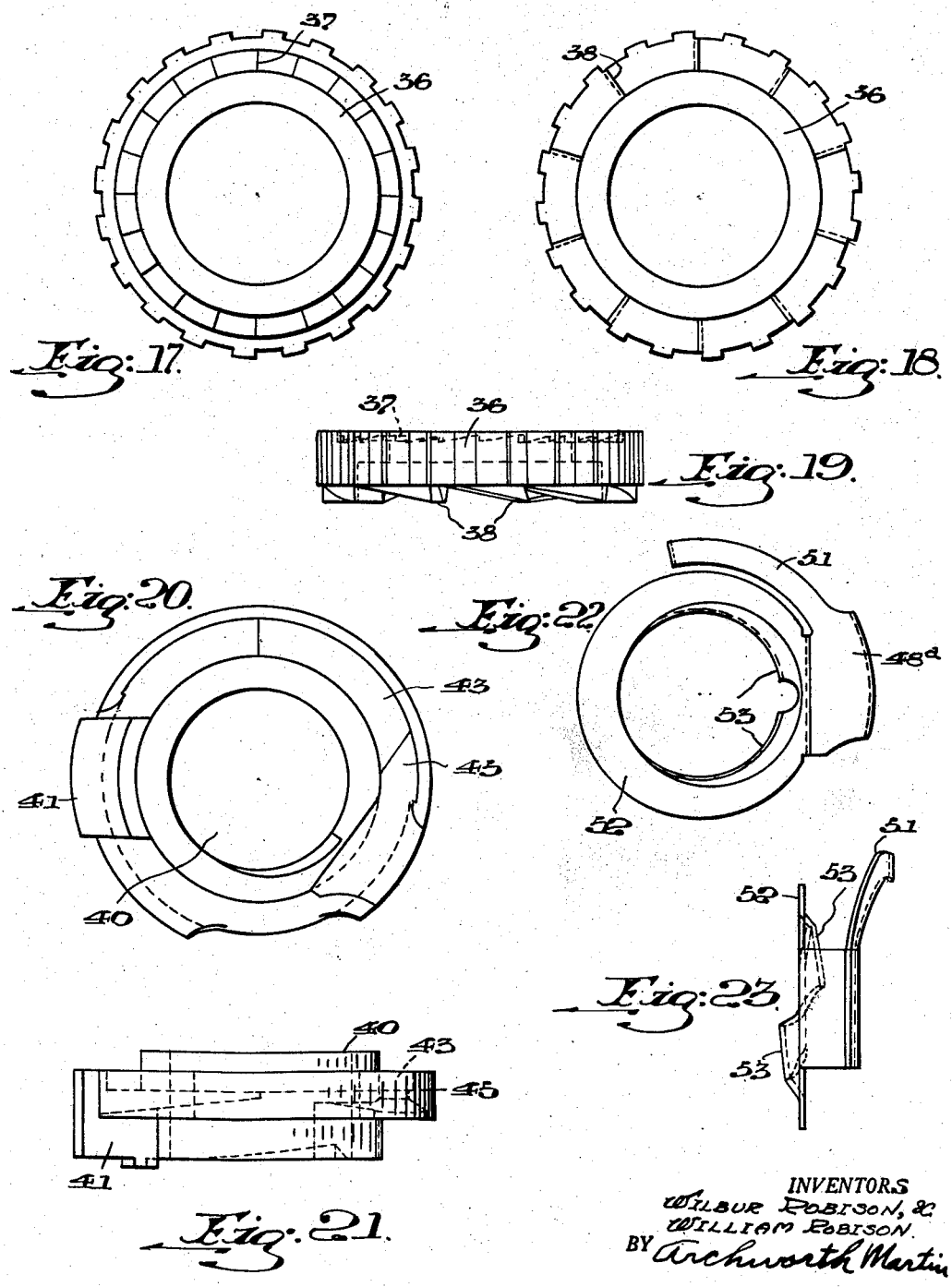

March 31, 1959

W. ROBISON ET AL 2,880,285

ELECTRIC SWITCHES

Filed Sept. 22, 1955

INVENTORS.
WILBUR ROBISON, &
WILLIAM ROBISON.
BY Archworth Martin
their
ATTORNEY

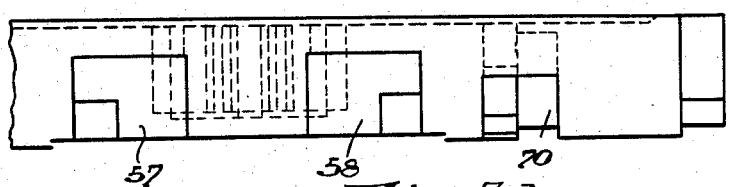
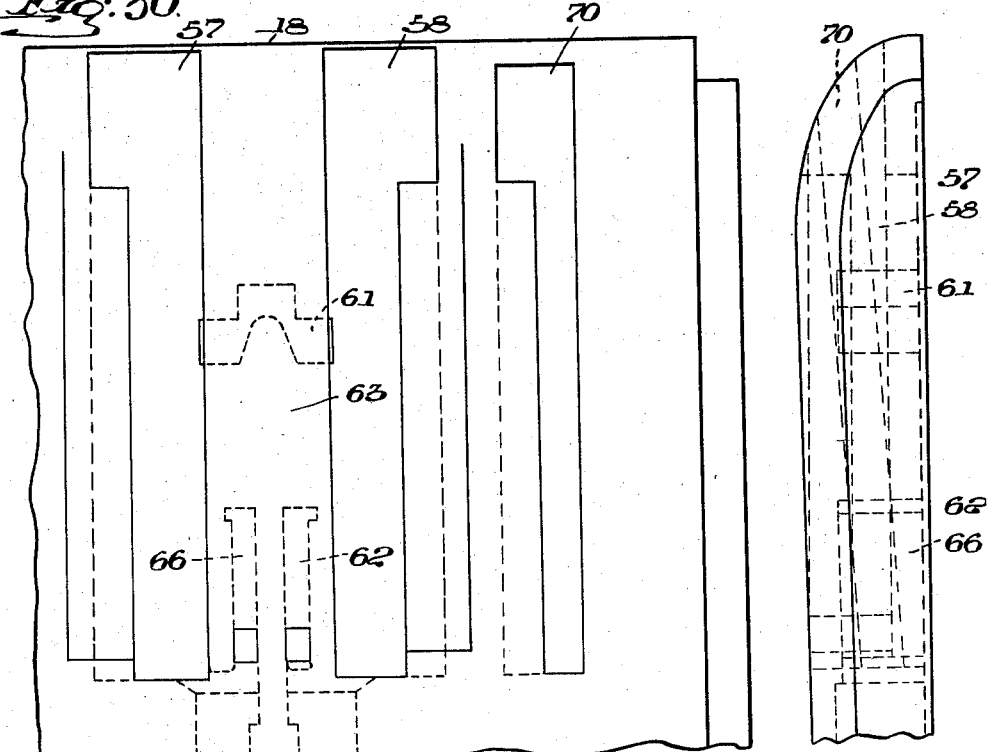
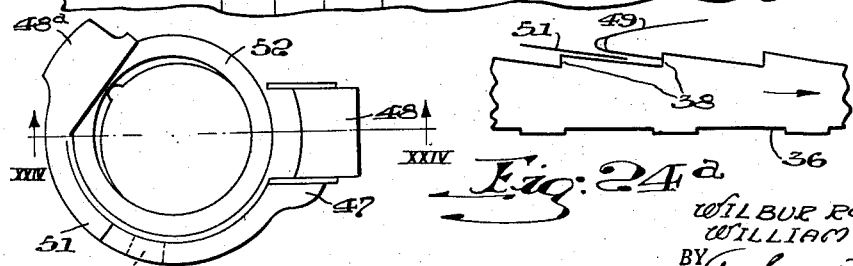
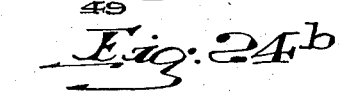

March 31, 1959   W. ROBISON ET AL   2,880,285
ELECTRIC SWITCHES

Filed Sept. 22, 1955   7 Sheets-Sheet 7

INVENTORS.
WILBUR ROBISON, &
WILLIAM ROBISON.
BY Archworth Martin
their
ATTORNEY.

United States Patent Office 2,880,285
Patented Mar. 31, 1959

2,880,285

ELECTRIC SWITCHES

Wilbur Robison and William Robison, Pittsburgh, Pa.; said William Robison assignor to Hilda S. Robison, Pittsburgh, Pa.

Application September 22, 1955, Serial No. 535,999

3 Claims. (Cl. 200—51)

Our invention relates to electric switches such as those commonly termed "wall switches," and has for one of its objects the provision of a night lamp and auxiliary switch therefor that can conveniently be applied to face plates that are easily substituted for conventional cover plates or cover plates of the ordinary switch installations.

Another object of our invention is to provide an auxiliary switch for a night lamp or the like, mounted on the face plate and connected in shunt relation to a switch in a circuit of conventional illuminating lamp, whereby the low-powered night lamp or lamp for finding the switch in the dark can be illuminated when the switch of the main lamp circuit is opened.

As shown in the accompanying drawing, Figure 1 shows a wiring diagram of lamp circuits and switches therefor suitable for use with our invention;

Fig. 2 is a face view, partly broken away, showing our auxiliary lamp and switch in assembled relation with the face plate of a wall switch;

Fig. 3 is a vertical sectional view of a wall with our switch and lamp applied thereto;

Fig. 4 is a plan view, on an enlarged scale, of the cup-like shell for the lamp base and auxiliary switch;

Fig. 5 is an end view thereof;

Fig. 6 shows a side elevational view thereof;

Fig. 7 is a plan view showing the central terminal member for a lamp and pawls for preventing backward movement of a switch-operating member;

Fig. 17 is a plan view of a rotatable member for operating the switch-contact members of Figs. 11 and 22;

Fig. 18 is an inverted plan view thereof;

Fig. 19 is an edge view thereof;

Figs. 20 and 21 are plan and side views respectively, of a separator plate contained within the switch housing;

Figs. 22 and 23 are plan and edge views respectively, of one of the switch contact members that are operated by the disc of Figs. 17 to 19;

Fig. 24a is an enlarged view of certain of the shunt switch members;

Fig. 24b is a plan view thereof;

Figure 24:
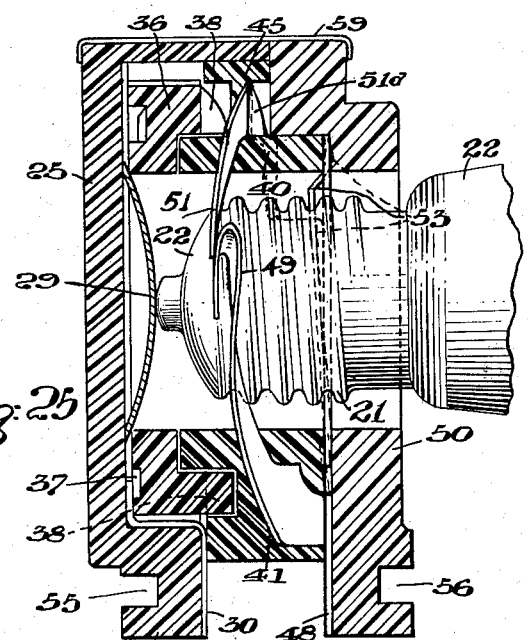
Fig. 24 is an enlarged sectional view on the line XXIV—XXIV of Fig. 2 through an assembly of the parts of Figs. 4 to 12 and 17 to 23.
Figure 26:
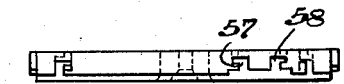
Figure 27:
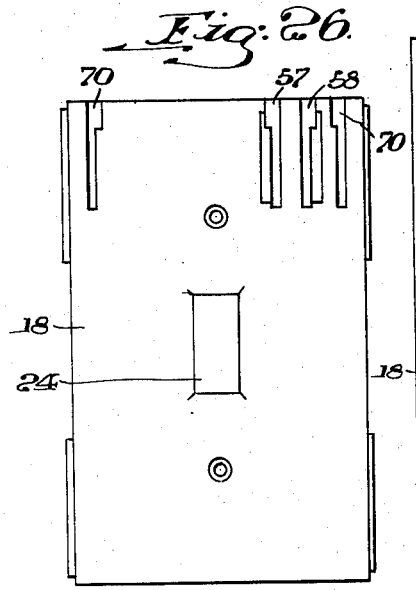
Figures 28, 29:
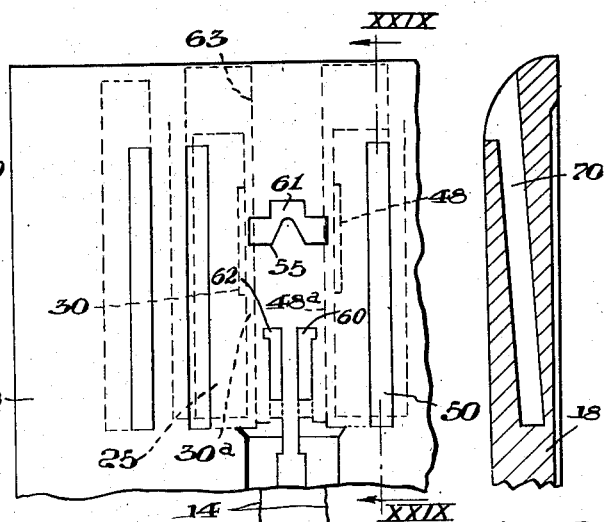
Figure 33:
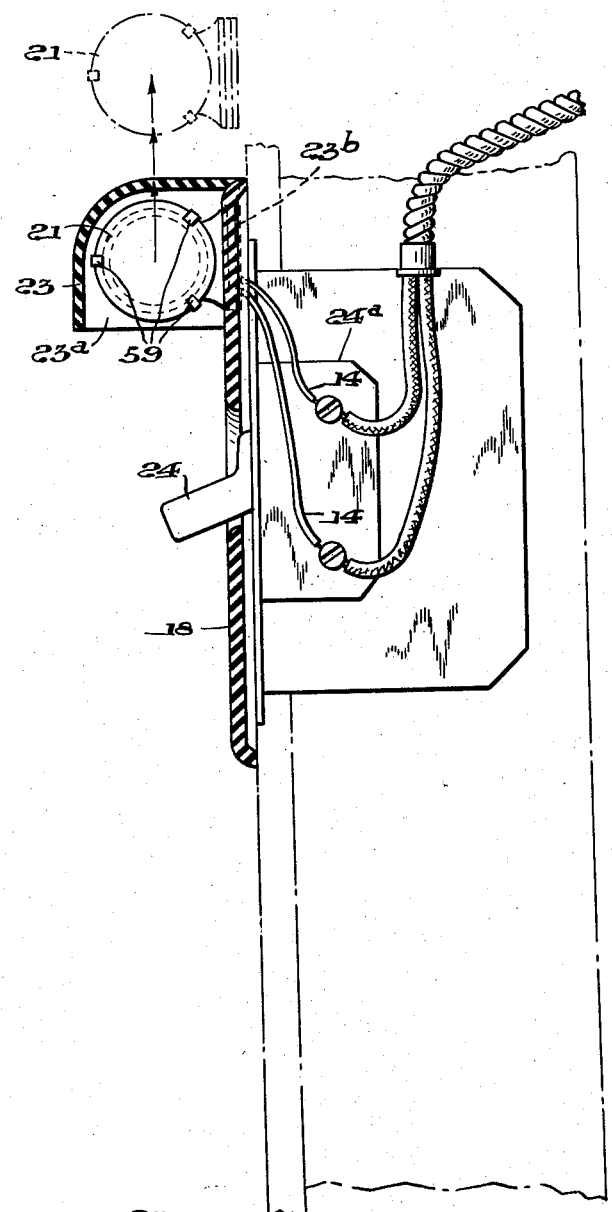
Figure 34:
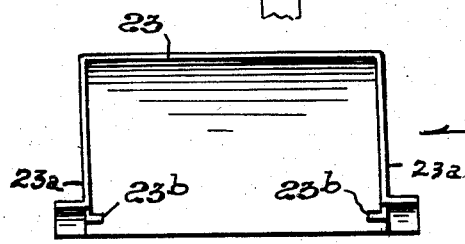

Figs. 26 and 27 are plan and face views respectively, of the wall plate of Figs. 2 and 3, showing slots by which the hood of Figs. 2 and 3 and the auxiliary switch and lamp base can be detachably connected to the wall plate;

Fig. 28 is an enlarged back view of a portion of the structure of Fig. 27, indicating the relative positions of certain of the conductors, and certain of the attaching elements of Fig. 24;

Fig. 29 is a view taken on the line XXIX—XXIX of Fig. 28;

Fig. 30 is an enlarged face view of the face plate of Fig. 28;

Figs. 31 and 32 are plan and edge views respectively, of Fig. 30;

Fig. 33 is a view taken on the line XXXIII—XXXIII of Fig. 2, and Fig. 34 is a bottom plan view of the hood of Figs. 2 and 3.

Figure 1 shows schematically a house-lighting circuit 10—11 for a main illuminating lamp 12, controlled by a switch 13. A shunt circuit 14 for a lamp 15 is controlled by a switch 16, so that the low wattage lamp 15 can be illuminated when no illumination is required at the lamp 12 and the switch 13 is opened. The conventionally-powered lamp at 12 will not produce illumination when the switch 13 is opened, because of the resistance offered by the low-powered lamp 15. A switch plate 18 of somewhat the usual type is secured against the room wall 19, to conceal the outer face of the switch box 13 in the usual manner.

A lamp socket and base 21 carries the auxiliary switch operating parts hereinafter to be described and a low-powered bulb 15, this switch base 21 being detachably connected to the face plate 18 in a manner to be hereinafter described as is also a hood or shield 23 that directs the light from the lamp 15 downwardly, so that it will serve as a night lamp or as a means for locating the main switch 13 in a room that is otherwise dark. The usual switch-operating lever 24 extends through the plate 18 from a conventional switch box 24a.

Figure 8:
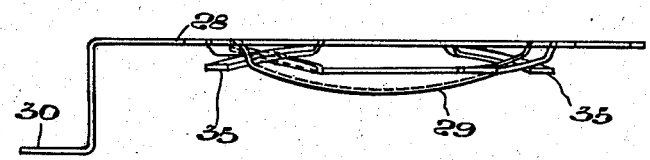
Fig. 8 is an edge view of the structure of Fig. 7.

The switch at 16 comprises a cup-like shell 25 of suitable non-conductive material such as one of the plastics. This shell has a flange 26 and an opening at 27 through its side wall. A conductor plate 28 (Figs. 7 and 8) has a central raised portion 29 that is engaged by the central terminal of the lamp 22 and has a lip-like extension 30 for connection to the conductor 30a through a cut-out or depression 31 in the shell 25. The plate 28 has pawl-like dogs 35 that will resist backward rotation of a switch-operating disc 36 which loosely fits into the shell 25 and is rotatable in one direction, it being held against backward rotative movement, by its teeth 37 on the surface that engages the pawls or dogs 35. The disc 36 is knurled on its edge and is exposed at the opening 27 of the shell 25 as shown in Fig. 2, whereby it can be turned step-by-step by the operator's thumb. On its other surface, the ring 36 has ratchet-like teeth 38 that serve to effect opening and closing of the switch 16.

Figure 9:
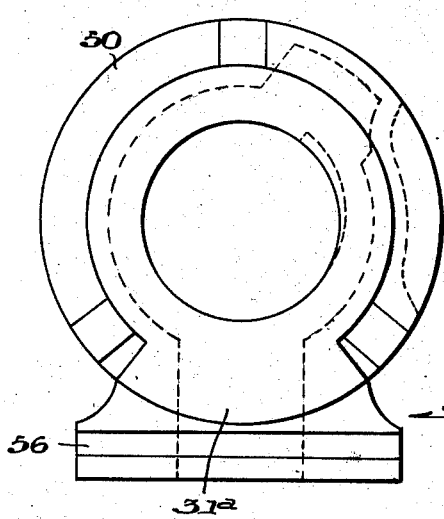
Fig. 9 is a plan view of the cover for the base and switch shell.
Figure 10:
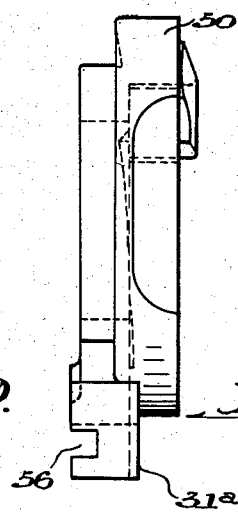
Fig. 10 is an edge view thereof.
Figure 11:
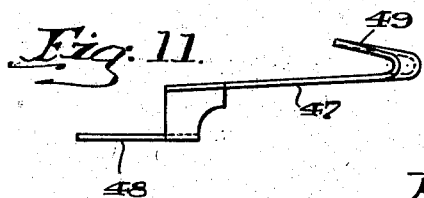
Fig. 11 is a view showing one of the switch members for controlling the circuit through the auxiliary lamp base of the auxiliary circuit.
Figure 13:
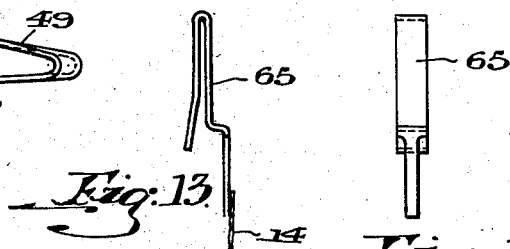
Figs. 13 and 14 are views showing one of the conductor members of Fig. 25.
Figure 14:
Figure 12:
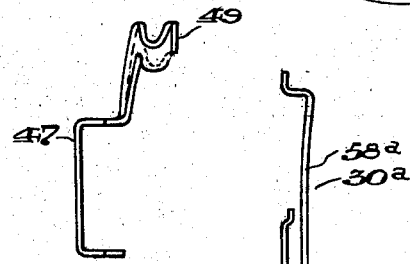
Fig. 12 is another view therof.
Figure 16:
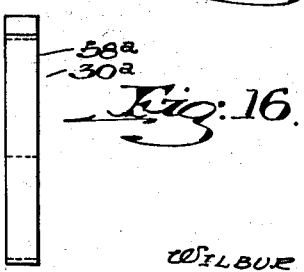
Figs. 15 and 16 are views of another of the conductor members of Fig. 25.

A separator plate 40 (Figs. 20–21) has a lip 41 that extends into the cut-out at 31 of Figs. 4, 5 and 6 and 31a of Figs. 9 and 10. The plate has a long hole therethrough at 43 and a boss 45. A terminal switch blade 47 (Figs. 11–12) fits against the separator plate 40 and has a lip 48 separated from the lip 30 by the boss 41. These two lips 30—48 form part of the shunt lamp circuit through the conductors 10—11 and 14.

The inner end of the blade 47 is bent outwardly to form a yieldable switch terminal at 49 that extends through the slot 43 far enough to have wiping engagement with the teeth 38 of the operating disc 36 during turning of the said disc. This member fits within a radial groove and through the hole 43 in the plate 40 (Figs. 20–21).

The second terminal for the threaded base of the lamp bulb comprises a yieldable arm 51 on an extension 51a of a ring 52 (Figs. 22-23) that fits within the shell cover 50 (Figs. 9-10). The switch arm 51 extends through the hole 43 in the separator plate 40, in opposed relation to the switch terminal member 49 when held against the switch member 51 by one of the teeth 38 of the operating disc 36. As said disc is given rotative movement and one of its teeth or pawls 38 passes out from engagement with the contact member 51 and engages behind the arm 49, the arms 51 and 49 will break engagement with each other (Fig. 24a) cutting the circuit from one side of the lamp to the terminal 48.

At the next step movement, that tooth will release 49 and the succeeding tooth will raise 51, to again complete the circuit.

The ring 52 also has wings 53 that are bent on helical lines and, together with the ring form a thread for screwing the lamp base into the socket, so that the innermost end of the lamp will engage the central boss 29 of the terminal plate 28.

The circumferential spacing of the ratchet-like teeth 37 and 38 on the lower and upper faces of the rotatable switch operating member is such that when a tooth 38 is in switch-closing position beneath the switch member 47, with the contact member 49 in engagement with the lower contact member 51 as in Fig. 24a, some of the teeth 37 on the underside of the member 36 will be engaged by the pawls 35 and thereby held against backward movement. The member 51 is springy and snaps down out of closed position each time the member 36 has been turned to a point at which it releases the switch-member 51. At this point backward movement of the rotatable member 36 is also prevented by the engagement of one or more of the pawls 35 with one or more of the teeth 37, as well as the engagement of the switch member 51 with one of the teeth 38 on the opposite side of the rotatable member 36.

As shown more clearly in Figs. 6, 10 and 24, the cup-like base 25 and the cover member 50 have grooves 55 and 56 formed in their extensions, in position to serve as connecting members for detachably joining the lamp base and its switch to the wall plate 18, the wall plate as shown more clearly in Figs. 26 and 27, having slots 57 and 58 to receive these hook-like members. Clips 59 (Figs. 2 and 24) hold the switch parts in assembled relation.

Figure 15:
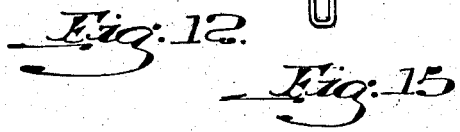
Figure 25:
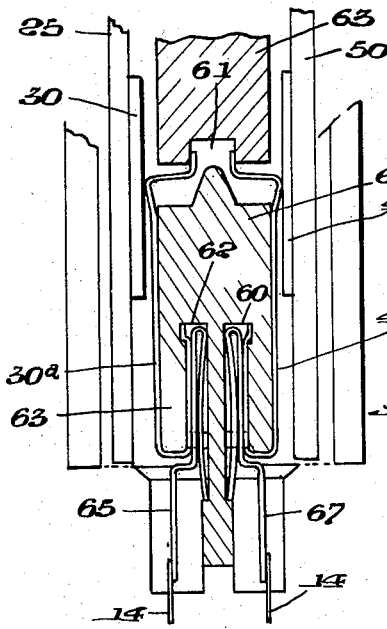
Fig. 25 is an enlarged vertical sectional view of a portion of the structure of Fig. 28.

Connection for the conductor lip 30 (Figs. 8, 24, 25) to the shunt line 14, is by way of a conductor strip 30a (Figs. 15, 25) that is supported at its ends in recesses 61—62 formed in a thick post-like rib 63 between the slots 57 and 58 of Fig. 27, the strip 30a being secured alongside the post 63 in position to have wiping engagement with the conductor 30 when the hooks at 55—56 on the switch base are hooked into the slots 57—58 of the face plate. The recess 62 also contains a conductor strip 65 which is soldered or otherwise connected to one of the conductor wires 14.

In a similar manner, the switch contact members 49 and 51 (Figs. 11, 23) and their conductor lip 48 (Figs. 11 and 25) are connectable to the other wire 14, through a conductor strip 48a contained in recesses 61 and 60 in the post 63 and a conductor strip 67 which is welded to the other wire of the shunt circuit 14. As shown in Figs. 2 and 3 the wires 14 are connected to the terminals 68—69 of the main switch 13.

The face plate 18 is preferably of highly reflective material such as a bright metal or other material having a high polish, so that light will be reflected therefrom to illuminate a room somewhat. The hood 23 not only shields the lamp somewhat, but reflects light rays against the plate 18. It has end walls 23a that extend backwardly and laterally to form hooks 23b (Figs. 2 and 34) for hooked engagement, through slots 70 (Fig. 27), with the plate 18, the slots being sloped somewhat as shown in Fig. 29, for tight fit.

Where it is desired to direct light upwardly from the auxiliary lamp 22, the hood 23 will be attached to the plate 18 in an inverted position and the lamp and its base then attached to the plate. Also, a switch plate with a multiple of switches can be used instead of the single plate 18 as shown on the drawing.

We claim as our invention:

1. Electrical lighting apparatus that comprises a combined lamp base socket and switch structure, the socket being closed at one end and of circular peripheral contour, a face plate on which the socket is supported on an axis parallel to the plane of the plate, relatively movable switch members carried by the socket and curved about said axis, one of the members having an extension that is helically curved along its inner edge and serves as a thread for a threaded lamp base and which thereby has electrical contact with the base, a switch-operating collar in the socket, disposed coaxially of the socket and circumferentially of a lamp base in the socket, the collar being rotatable about the said axis, teeth on the periphery of the collar in position to move the switch members upon rotative movements of the collar in one direction, the switch members being yieldably urged against the teeth and successively engaged by each tooth, to move them into and out of contact with each other, a terminal member in the end of the socket, in position to complete a circuit through the endmost terminal of the lamp base, and conductor members respectively extending from the other one of relatively-movable switch members and said end terminal, to points outside the socket, in position for connection to the wiring of an electrical circuit.

2. A structure as recited in claim 1, wherein there are teeth on the collar shaped to serve as ratchet teeth and a disc that is fixedly-mounted in the socket for yieldable pawls to engage that face of each tooth which will prevent rotation of the collar in the other direction.

3. A structure as recited in claim 1, wherein the collar has a knurled periphery that is accessible through an opening in a side of the socket, for use in rotating the collars.

References Cited in the file of this patent

UNITED STATES PATENTS

| | | |
|---|---|---|
| 2,023,819 | Pavelka | Dec. 10, 1935 |
| 2,193,740 | Reed | Mar. 12, 1940 |
| 2,217,395 | Wertzheiser | Oct. 8, 1940 |
| 2,428,167 | Linton | Sept. 30, 1947 |
| 2,580,056 | Wheeler | Dec. 25, 1951 |
| 2,674,689 | Thornton et al. | Apr. 6, 1954 |